(12) United States Patent
Bean et al.

(10) Patent No.: US 12,270,443 B2
(45) Date of Patent: Apr. 8, 2025

(54) BRAKE ROTOR WITH WORKING SURFACE INSERTS

(71) Applicant: Tech M3, Inc., Poway, CA (US)

(72) Inventors: Richard Bean, El Cajon, CA (US);
Nathan K. Meckel, Ramona, CA (US);
Walter F. Frankiewicz, Marblehead, OH (US)

(73) Assignee: Tech M3, Inc., Poway, CA (US)

( * ) Notice: Subject to any disclaimer, the term of this patent is extended or adjusted under 35 U.S.C. 154(b) by 0 days.

(21) Appl. No.: 17/186,560

(22) Filed: Feb. 26, 2021

(65) Prior Publication Data

US 2022/0018409 A1  Jan. 20, 2022

Related U.S. Application Data

(63) Continuation of application No. 16/729,863, filed on Dec. 30, 2019, now abandoned, which is a
(Continued)

(51) Int. Cl.
*F16D 65/12* (2006.01)
*F16D 65/092* (2006.01)
(Continued)

(52) U.S. Cl.
CPC ......... *F16D 65/122* (2013.01); *F16D 65/092* (2013.01); *F16D 65/12* (2013.01);
(Continued)

(58) Field of Classification Search
CPC ...... F16D 65/092; F16D 65/12; F16D 65/122; F16D 65/125; F16D 65/127;
(Continued)

(56) References Cited

U.S. PATENT DOCUMENTS 2,753,808 A   7/1956  Kluge
3,171,527 A   3/1965  Ott
(Continued)

FOREIGN PATENT DOCUMENTS

DE       538507 C       11/1931
DE   102004016092 A1    10/2005
(Continued)

OTHER PUBLICATIONS

Tritt, Terry "Thermal Conductivity: Theory, Properties and Applications", (2004) p. 100.
(Continued)

*Primary Examiner* — Thomas W Irvin
(74) *Attorney, Agent, or Firm* — The Dobrusin Law Firm, PC

(57) ABSTRACT

A brake rotor assembly can include a structural part having a receiving surface and at least one friction surface parts having a contact surface. The friction surface part can be fixably attached to the receiving surface of the structural part such that the contact surface faces away from the receiving surface of the structural surface to form at least part of an annular braking surface arranged concentrically around an axis of rotation of the structural part.

7 Claims, 9 Drawing Sheets

Related U.S. Application Data continuation of application No. 15/312,573, filed as application No. PCT/US2015/031609 on May 19, 2015, now abandoned.

(60) Provisional application No. 62/000,461, filed on May 19, 2014.

(51) Int. Cl.
| | |
|---|---|
| *F16D 65/847* | (2006.01) |
| *F16D 69/00* | (2006.01) |
| *F16D 69/02* | (2006.01) |
| *F16D 69/04* | (2006.01) |
| *F16D 65/02* | (2006.01) |
| *F16D 65/78* | (2006.01) |

(52) U.S. Cl.
CPC ......... *F16D 65/125* (2013.01); *F16D 65/127* (2013.01); *F16D 65/128* (2013.01); *F16D 65/847* (2013.01); *F16D 69/00* (2013.01); *F16D 69/023* (2013.01); *F16D 69/027* (2013.01); *F16D 69/0408* (2013.01); *F16D 2065/1316* (2013.01); *F16D 2065/132* (2013.01); *F16D 2065/1324* (2013.01); *F16D 2065/1328* (2013.01); *F16D 2065/788* (2013.01); *F16D 2069/003* (2013.01); *F16D 2069/004* (2013.01); *F16D 2069/0433* (2013.01); *F16D 2069/0441* (2013.01); *F16D 2069/0458* (2013.01); *F16D 2069/0466* (2013.01); *F16D 2200/0008* (2013.01); *F16D 2200/0013* (2013.01); *F16D 2200/0021* (2013.01); *F16D 2200/0039* (2013.01); *F16D 2200/0047* (2013.01); *F16D 2250/0084* (2013.01)

(58) Field of Classification Search
CPC ...... F16D 65/128; F16D 65/847; F16D 69/00; F16D 69/023; F16D 69/027; F16D 69/0408
See application file for complete search history.

(56) References Cited

U.S. PATENT DOCUMENTS

| | | | |
|---|---|---|---|
| 3,314,509 A | 4/1967 | Pelikan | |
| 3,403,759 A * | 10/1968 | Holcomb, Jr. | ........ F16D 65/122 |
| | | | 188/218 R |
| 3,443,454 A | 5/1969 | Hall | |
| 3,613,851 A * | 10/1971 | Ely | ....................... F16D 65/121 |
| | | | 192/107 R |
| 3,708,042 A * | 1/1973 | Krause | .................... F16D 55/36 |
| | | | 188/73.2 |
| 3,899,054 A | 8/1975 | Huntress et al. | |
| 3,907,076 A * | 9/1975 | Crossman | ............. F16D 65/121 |
| | | | 188/218 XL |
| 3,993,415 A | 11/1976 | Hauser | |
| 4,180,622 A | 12/1979 | Burkhard et al. | |
| 4,290,510 A | 9/1981 | Warren | |
| 4,350,231 A * | 9/1982 | Crossman | ............. F16D 65/092 |
| | | | 188/218 XL |
| 4,555,239 A | 11/1985 | Miranti, Jr. | |
| 4,565,274 A * | 1/1986 | Cameron | ................. F16D 69/00 |
| | | | 192/107 R |
| 4,613,021 A * | 9/1986 | Lacombe | .............. F16D 65/122 |
| | | | 188/218 XL |
| 4,808,275 A | 2/1989 | Ohzora | |
| 4,837,250 A | 6/1989 | Headrick et al. | |
| 4,848,553 A * | 7/1989 | Cameron | ................ F16D 13/64 |
| | | | 192/107 R |
| 4,860,872 A * | 8/1989 | Flotow | .................... F16D 13/64 |
| | | | 192/107 R |
| 4,869,356 A * | 9/1989 | Cameron | ................ F16D 13/64 |
| | | | 192/107 M |
| 4,933,300 A | 6/1990 | Koinuma et al. | |
| 5,116,691 A | 5/1992 | Darolia et al. | |
| 5,158,165 A * | 10/1992 | Flotow | .................... F16D 13/64 |
| | | | 192/107 R |
| 5,306,407 A | 4/1994 | Hauzer et al. | |
| 5,407,035 A | 4/1995 | Cole et al. | |
| 5,501,306 A | 3/1996 | Martino | |
| 5,535,857 A | 7/1996 | Barlow | |
| 5,558,186 A * | 9/1996 | Hyde | ...................... F16D 55/40 |
| | | | 188/218 XL |
| 5,709,288 A * | 1/1998 | Riebe | .................... F16D 65/122 |
| | | | 188/218 XL |
| 5,725,913 A | 3/1998 | Wong et al. | |
| 5,769,185 A * | 6/1998 | Main | ..................... F16D 65/126 |
| | | | 188/18 A |
| 5,838,522 A | 11/1998 | Komvopoulos et al. | |
| 5,861,203 A | 1/1999 | Yuan et al. | |
| 5,884,388 A | 3/1999 | Patrick et al. | |
| 5,901,818 A | 5/1999 | Maryino | |
| 5,922,452 A | 7/1999 | Takahashi et al. | |
| 5,928,771 A | 7/1999 | DeWald, Jr. et al. | |
| 6,119,828 A | 9/2000 | Parsons | |
| 6,155,397 A | 12/2000 | Killian | |
| 6,196,936 B1 | 3/2001 | Meckel | |
| 6,261,692 B1 | 7/2001 | Park | |
| 6,302,246 B1 | 10/2001 | Naumann et al. | |
| 6,457,566 B1 | 10/2002 | Toby | |
| 6,514,592 B1 | 2/2003 | Hubbard et al. | |
| 6,527,092 B2 | 3/2003 | Gruber et al. | |
| 6,536,564 B1 | 3/2003 | Garfinkel et al. | |
| 6,585,089 B1 | 7/2003 | Parker | |
| 6,612,110 B1 | 9/2003 | Silverbrook | |
| 6,612,415 B2 | 9/2003 | Yamane | |
| 6,797,388 B1 | 9/2004 | Szanyi et al. | |
| 6,857,509 B1 | 2/2005 | Braiato et al. | |
| 6,935,470 B1 * | 8/2005 | Smith, Jr. | ............... F16D 65/12 |
| | | | 188/218 XL |
| 7,097,922 B2 | 8/2006 | Shen et al. | |
| 7,246,586 B2 | 7/2007 | Hosenfieldt et al. | |
| 7,261,192 B2 | 8/2007 | Khambekar et al. | |
| 7,799,420 B2 | 9/2010 | Beck et al. | |
| 8,084,089 B2 | 12/2011 | Meckel | |
| 8,408,369 B2 * | 4/2013 | Woychowski | .......... F16D 65/12 |
| | | | 188/218 XL |
| 8,449,943 B2 | 5/2013 | Meckel | |
| 8,893,863 B2 * | 11/2014 | Meckel | ................... F16D 65/12 |
| | | | 188/218 XL |
| 9,255,618 B2 * | 2/2016 | Beer | ...................... F16D 65/847 |
| 9,394,955 B2 | 7/2016 | Huschenhoefer et al. | |
| 9,618,066 B2 | 4/2017 | Schoepf et al. | |
| 9,638,276 B2 | 5/2017 | Schluck et al. | |
| 9,653,978 B2 | 5/2017 | Zernikow et al. | |
| 10,274,034 B2 * | 4/2019 | Fiala | ..................... F16D 65/126 |
| 2002/0117360 A1 | 8/2002 | Toby | |
| 2002/0153213 A1 | 10/2002 | Gruber et al. | |
| 2003/0136614 A1 | 7/2003 | Feldmann et al. | |
| 2003/0145447 A1 | 8/2003 | Moseley et al. | |
| 2003/0183306 A1 | 10/2003 | Hehmann et al. | |
| 2004/0129314 A1 | 7/2004 | Welty et al. | |
| 2004/0178029 A1 * | 9/2004 | Hoyte | .................... F16D 65/12 |
| | | | 188/218 XL |
| 2005/0056495 A1 | 3/2005 | Freppi | |
| 2005/0087406 A1 | 4/2005 | Meckel | |
| 2005/0183909 A1 | 8/2005 | Rau et al. | |
| 2005/0252739 A1 | 11/2005 | Callahan et al. | |
| 2006/0079749 A1 | 4/2006 | Grau et al. | |
| 2006/0175160 A1 | 8/2006 | Weiss | |
| 2007/0234929 A1 | 10/2007 | Reinsch et al. | |
| 2007/0286961 A1 | 12/2007 | Pahle et al. | |
| 2008/0041675 A1 | 2/2008 | Baumgartner | |
| 2008/0196985 A1 | 8/2008 | Meckel | |
| 2008/0196986 A1 | 8/2008 | Meckel | |
| 2008/0213610 A1 | 9/2008 | Idei et al. | |
| 2009/0026025 A1 | 1/2009 | Hamoton | |
| 2009/0026026 A1 | 1/2009 | Martino | |
| 2009/0050423 A1 | 2/2009 | Meckel | |

(56) References Cited

U.S. PATENT DOCUMENTS

| | | | |
|---|---|---|---|
| 2009/0288921 A1* | 11/2009 | Meckel | F16D 65/12 188/73.1 |
| 2011/0048871 A1 | 3/2011 | Meckel | |
| 2011/0056777 A1* | 3/2011 | Woychowski | F16D 65/12 188/218 XL |
| 2011/0135948 A1 | 6/2011 | Pyzik et al. | |
| 2012/0037465 A1 | 2/2012 | Abe et al. | |
| 2012/0118686 A1 | 5/2012 | Meckel | |
| 2013/0008748 A1 | 1/2013 | Lemback | |
| 2013/0112514 A1 | 5/2013 | Hanna et al. | |
| 2013/0161136 A1 | 6/2013 | Huschenhoefer et al. | |
| 2013/0161137 A1 | 6/2013 | Huschenhoefer | |
| 2013/0220745 A1 | 8/2013 | Meckel | |
| 2014/0332330 A1 | 11/2014 | Orr et al. | |
| 2015/0041262 A1 | 2/2015 | Meckel | |
| 2015/0159710 A1 | 6/2015 | Holly et al. | |
| 2015/0369314 A1 | 12/2015 | Filip | |
| 2015/0369315 A1* | 12/2015 | Wall | F16D 55/225 188/18 A |
| 2016/0017944 A1 | 1/2016 | Meckel | |
| 2016/0108981 A1 | 4/2016 | Meckel | |

FOREIGN PATENT DOCUMENTS

| | | |
|---|---|---|
| DE | 102011122308 A1 | 6/2012 |
| EP | 1256739 A2 | 11/2002 |
| EP | 1258647 B1 | 2/2012 |
| EP | 2707621 B1 | 7/2016 |
| FR | 788671 A | 10/1935 |
| FR | 2807484 A1 | 10/2001 |
| GB | 2154614 A | 9/1965 |
| JP | 63026210 A | 2/1988 |
| JP | 02175859 A | 7/1990 |
| JP | 04312220 A1 | 11/1992 |
| JP | 04337126 A | 11/1992 |
| JP | 04337127 A | 11/1992 |
| JP | 07208520 A | 8/1995 |
| JP | 07224390 A | 8/1995 |
| JP | 09118755 A | 5/1997 |
| JP | 2003049252 A | 2/2003 |
| JP | 2004316850 A | 11/2004 |
| KR | 101998049479 A | 9/1998 |
| KR | 20060051087 A | 5/2006 |
| KR | 20100098817 A | 9/2010 |
| WO | 9738235 A1 | 10/1997 |
| WO | 98/50837 A1 | 11/1998 |
| WO | 2006/092270 A1 | 9/2006 |

OTHER PUBLICATIONS

Yu et al. "Vapor deposition of platinum alloyed nickel aluminide coatings." Surface & Coatings Technology 201. (Jun. 2006) pp. 2326-2334.

International Search Report Issued in PCT/US2015/031609 on Sep. 2, 2015.

* cited by examiner

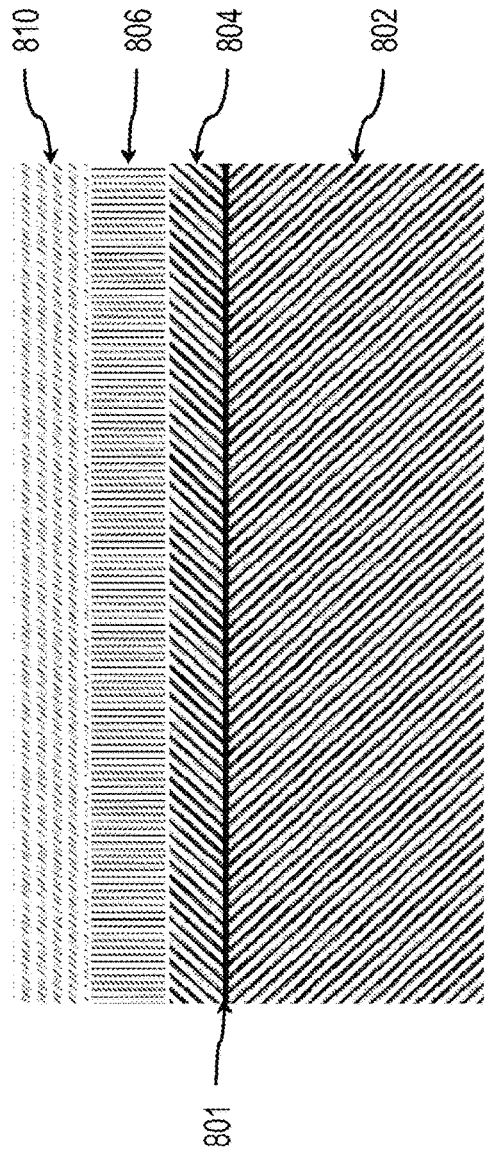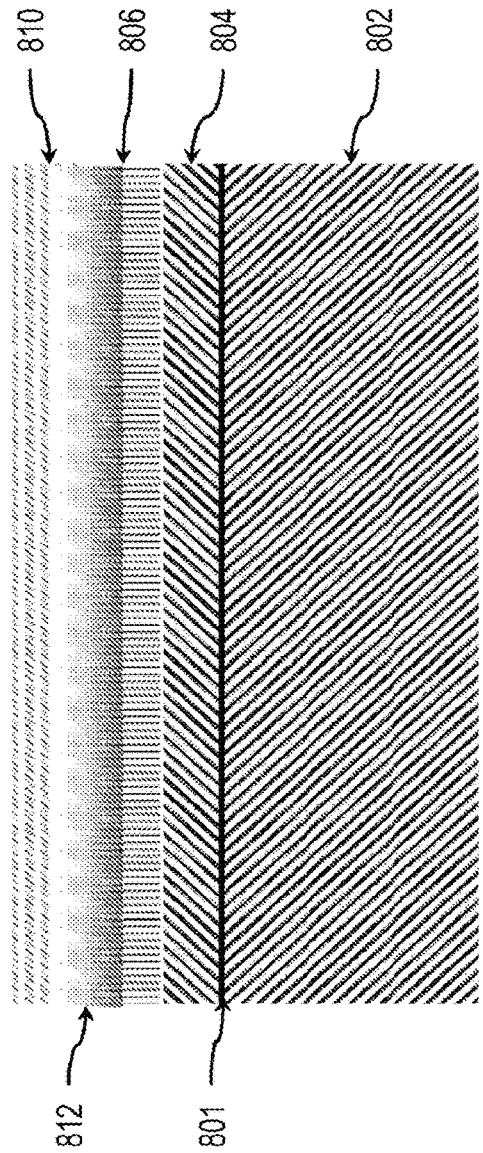

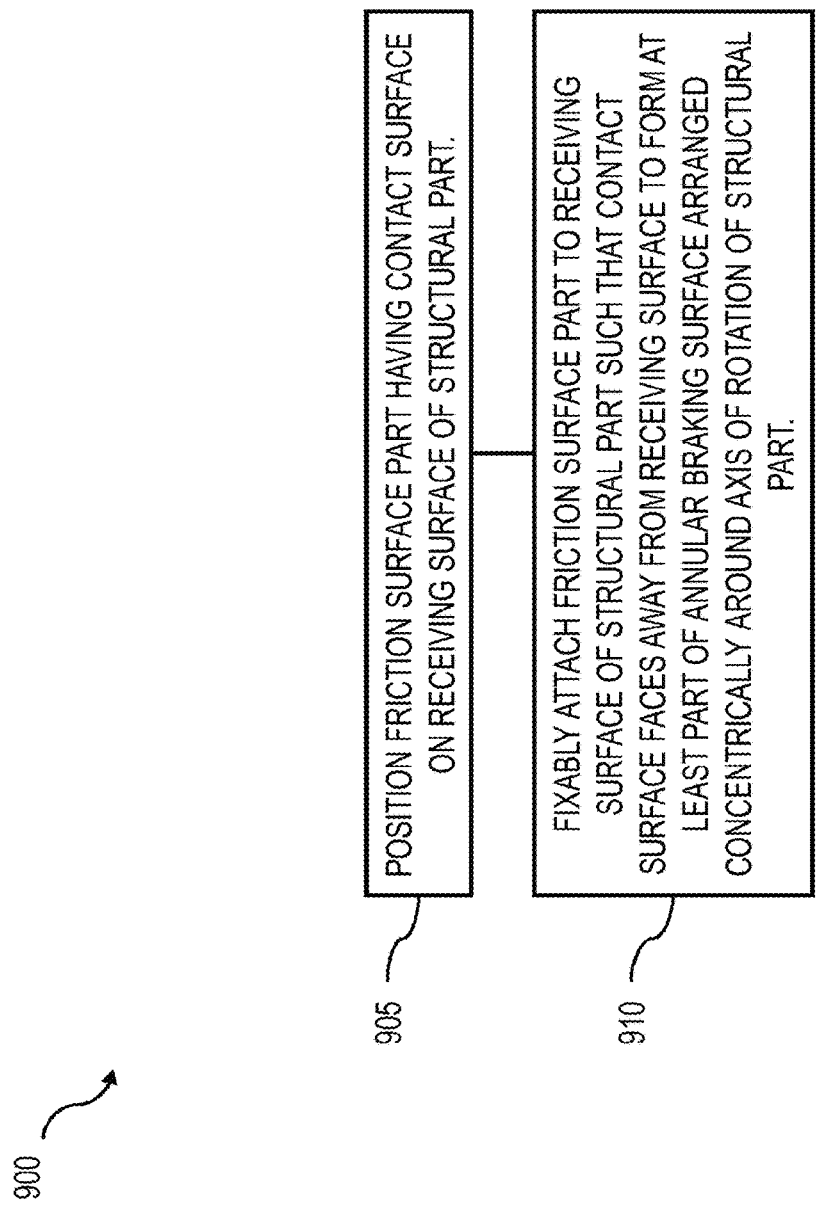

BRAKE ROTOR WITH WORKING SURFACE INSERTS

CROSS-REFERENCE TO RELATED APPLICATION

The current application claims priority to U.S. Provisional Application Ser. No. 62/000,461 filed May 19, 2014, the disclosure of which is incorporated herein by reference in its entirety.

TECHNICAL FIELD

The subject matter described herein relates generally to braking systems.

BACKGROUND

A braking system generally includes two surfaces that are urged into contact with one another when the braking system is actuated, for example when an operator of a vehicle, or alternatively one or more automated or semi-automated safety systems of the vehicle, operates a control to applying braking force to slow rotation of an axle of a vehicle and to thereby slow or stop the vehicle. A first surface of the two surfaces can be part of a rotor assembly, which is generally mounted in association with (e.g. rotationally fixed to) an axle and one or more wheels of the vehicle, and which rotates at a same rotational velocity as the one or more wheels. A second surface of the two surfaces can be part of a pressure applicator assembly, which can be mounted such that the pressure applicator assembly does not rotate with the one or more wheels.

SUMMARY

In one aspect, a brake rotor assembly includes a structural part, which can have having a receiving surface aligned perpendicularly to an axis of rotation of the structural part, and a friction surface part having a contact surface. The friction surface part is fixably attached to the receiving surface of the structural part such that the contact surface faces away from the receiving surface of the structural surface to form at least part of an annular braking surface arranged concentrically around the axis of rotation.

In an interrelated aspect, a braking system includes the aforementioned brake rotor assembly, a brake pad that includes a friction material, and an apparatus for urging the friction material of the brake pad against the annular braking surface to slow rotation of the brake rotor assembly and a vehicle axle to which the brake rotor assembly is rotationally fixed.

In yet another interrelated aspect, a method for assembling a brake rotor assembly includes positioning a friction surface part having a contact surface on a receiving surface of a structural part and fixably attaching the friction surface part to the receiving surface of the structural part such that the contact surface faces away from the receiving surface of the structural part to form at least part of an annular braking surface arranged concentrically around an axis of rotation of the structural part.

In some variations one or more of the following features can optionally be included in any feasible combination. The friction material can include at least one of stainless steel, cast iron, a ceramic, and a composite, and the friction surface part can include a brake pad material. The friction material of the brake pad can include at least one of stainless steel, cast iron, a ceramic, a composite, and a brake pad material. The friction material of the brake pad can include a wear and corrosion resistant coating. The friction surface part can include a same material as the friction material of the brake pad. The friction material of the brake pad can include one or more levels of surface topography The friction surface part can include a plurality of friction surface parts arranged on the receiving surface to form the at least part of the annular braking surface. The friction surface part can include at least one of stainless steel, cast iron, a ceramic, a composite, and a brake pad material.

The contact surface of the friction surface part can include a wear and corrosion resistant coating. The contact surface of the friction surface part can alternatively or additionally include one or more levels of surface topography. The one or more levels of surface topography can include a first level that includes island formations separated by channels. The one or more levels of surface topography can further include a second level comprising raised peaks with spaced valleys between the peaks. The second level of surface topography can assist in retaining the transferred film or layer of brake pad material on the contact surface. The transferred film or layer of brake pad material can enhance braking by participating in adhesive friction with a brake pad.

The structural part can be formed of at least one bulk material selected from a ceramic, a metal matrix, a composite material, cast iron, and carbon fiber. The structural part can include a physical structure to enhance cooling, and this physical structure can include a vane and/or a channel. The brake rotor assembly can include an attachment feature for fixably attaching the friction surface part to the receiving surface, and this attachment feature can include at least one of a screw, a bolt, a connecting pin, an adhesive, a weld, a braze, a retaining ridge and, an at least partially recessed or indented area on the receiving surface into which at least part of the friction surface part is seated.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 8A and FIG. 8B show diagrams illustrating cross-sectional, magnified views of a brake rotor coated in a manner consistent with one or more implementations of the current subject matter, with FIG. 8A showing discrete layers and FIG. 8B showing at least partial integration of the components of separate layers to form a combined layer; and FIG. 9 shows a process flow chart illustrating features of a method consistent with implementations of the current subject matter.

When practical, similar reference numbers denote similar structures, features, or elements.

DETAILED DESCRIPTION

Figure 1:
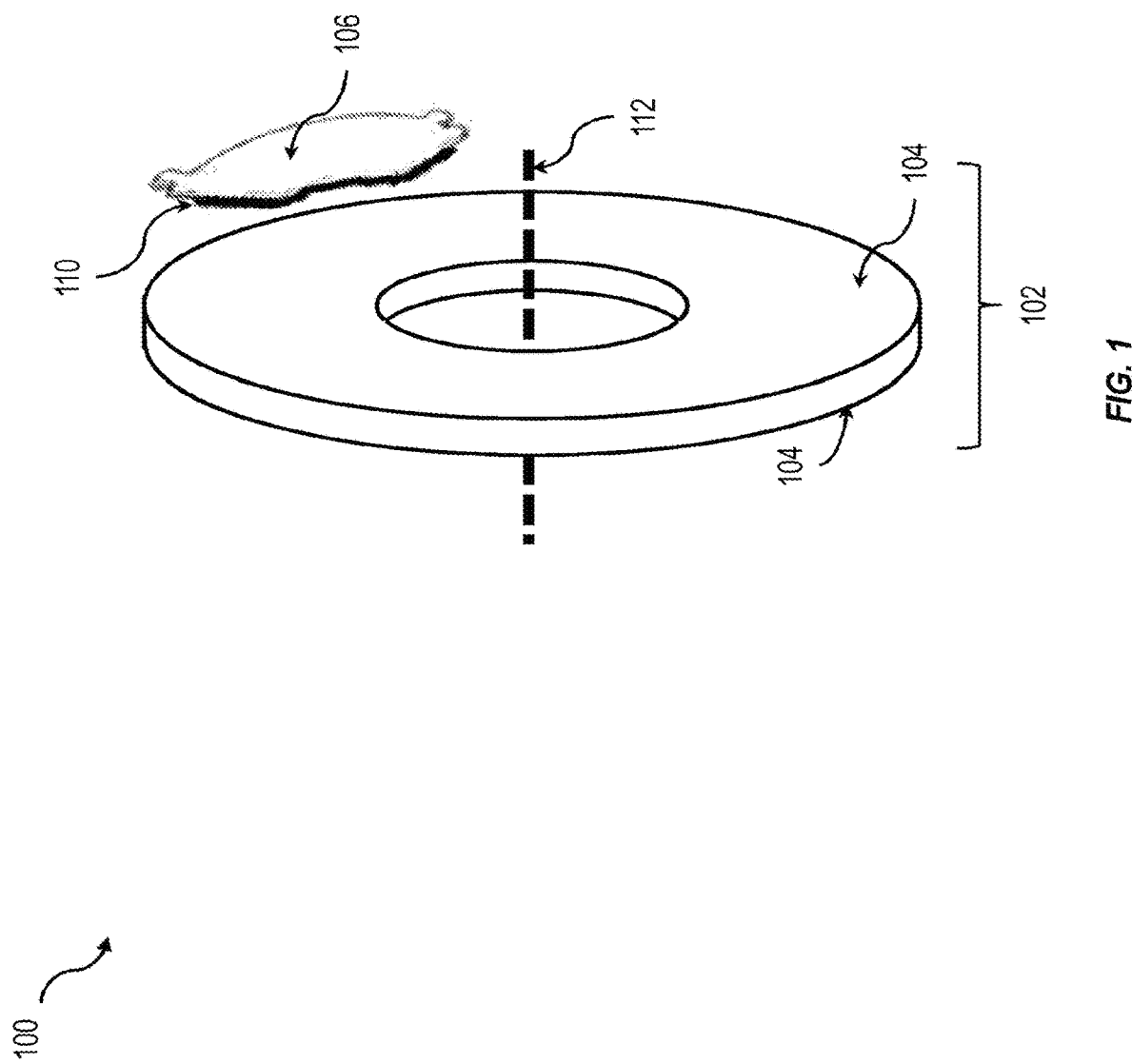
FIG. 1 shows a diagram illustrating features of a braking system.

A conventional example of a braking system 100, as illustrated in FIG. 1, includes a brake rotor 102 having friction surfaces 104 machined or otherwise formed onto a substrate material and a brake pad 106 positioned on a caliper or other apparatus (not shown) configured to urge the brake pad 106 against one of the friction surfaces 104. A brake pad 106 in such a braking system 100 typically includes a friction material 110 designed to participate in an abrasive friction interaction with a friction surface 104 of the brake rotor 102 as the brake pad 106 is urged against the brake rotor 102 to slow rotation of the brake rotor 102 and the associated one or more wheels (not shown) about an axis of rotation 112. The friction material 110 is typically designed to wear away during use of the braking system 100. The abrasive friction interaction of the friction material 110 with the friction surface 104 also typically causes wear to the friction surface such that the brake rotor 102 requires re-machining or replacement during at least some instances of servicing or maintenance of the braking system 100.

Figure 2:
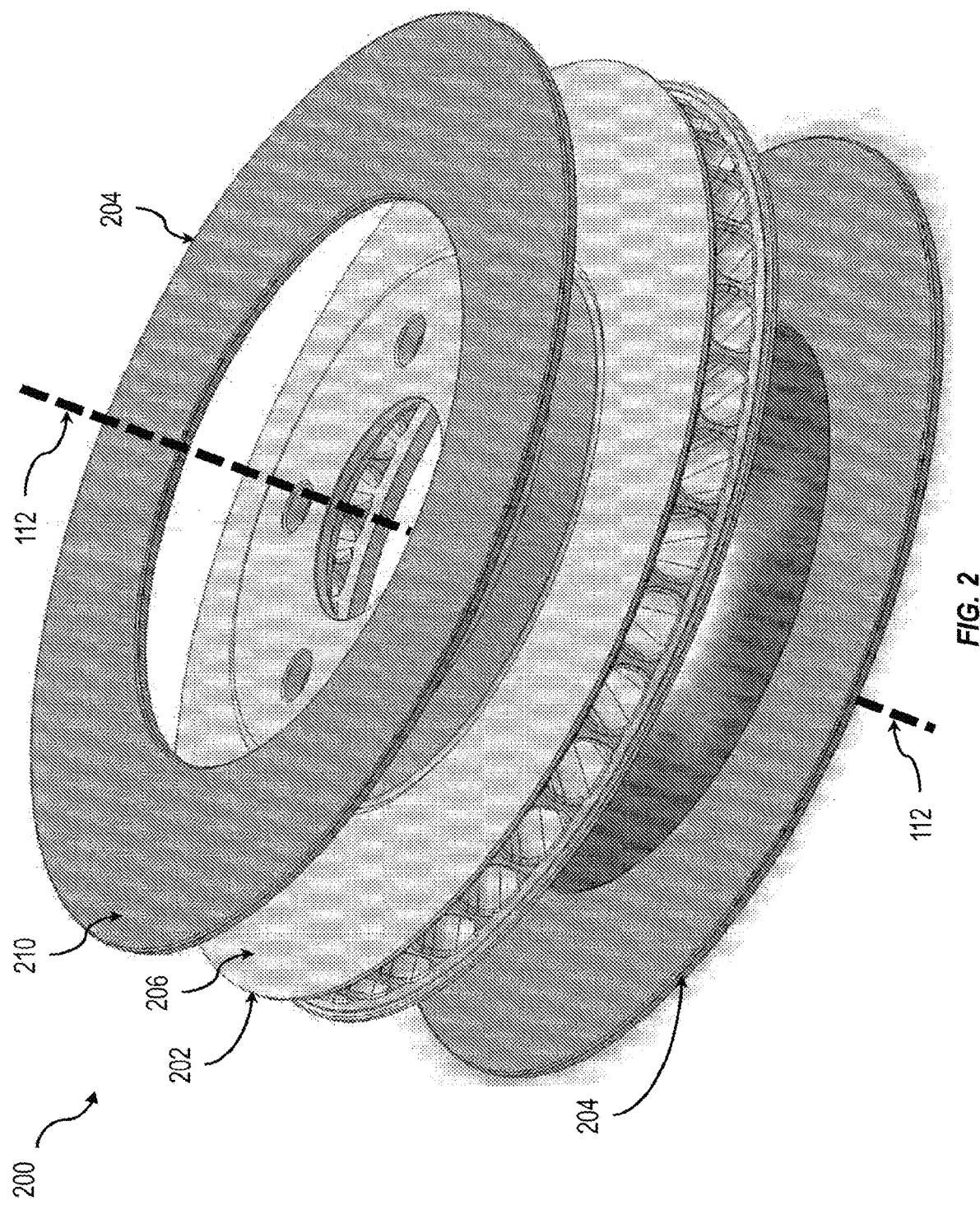
FIG. 2 shows a diagram illustrating features of a brake rotor assembly consistent with implementations of the current subject matter.

An approach consistent with the current subject matter can include use of a modular surface on the brake rotor assembly, for example a brake rotor assembly 200 as illustrated in FIG. 2. The term modular is used herein to refer to one or more pieces or parts of the brake rotor assembly that are not integral to the bulk structure of the brake rotor assembly. In other words, the brake rotor assembly 200 can include at least two parts—a structural part 202 and one or more friction surface parts 204—that are joined together. The brake rotor assembly 200 shown in FIG. 2 includes a structural part 202 and two friction surface parts 204, each of which is joined to the structural part 202 on one of two opposed receiving surfaces 206 of the structural part 202 such that a (outer) contact surface 210 of each friction surface part 204 faces away from the structural part 202 to provide a comparable function to a machined or otherwise formed friction surface 104 on a conventional brake rotor 102. The contact surface 210 of a friction surface part 204 forms at least part of an annular braking surface arranged concentrically around the axis of rotation 112. In the example of FIG. 2, each friction surface part forms an entirety of the annular braking surface. However, this need no be the case. Also as shown in FIG. 2, the structural part 202 can optionally include vanes, channels, or other physical structures, for example to provide or enhance cooling of the brake rotor assembly 200, etc.

Figure 3:
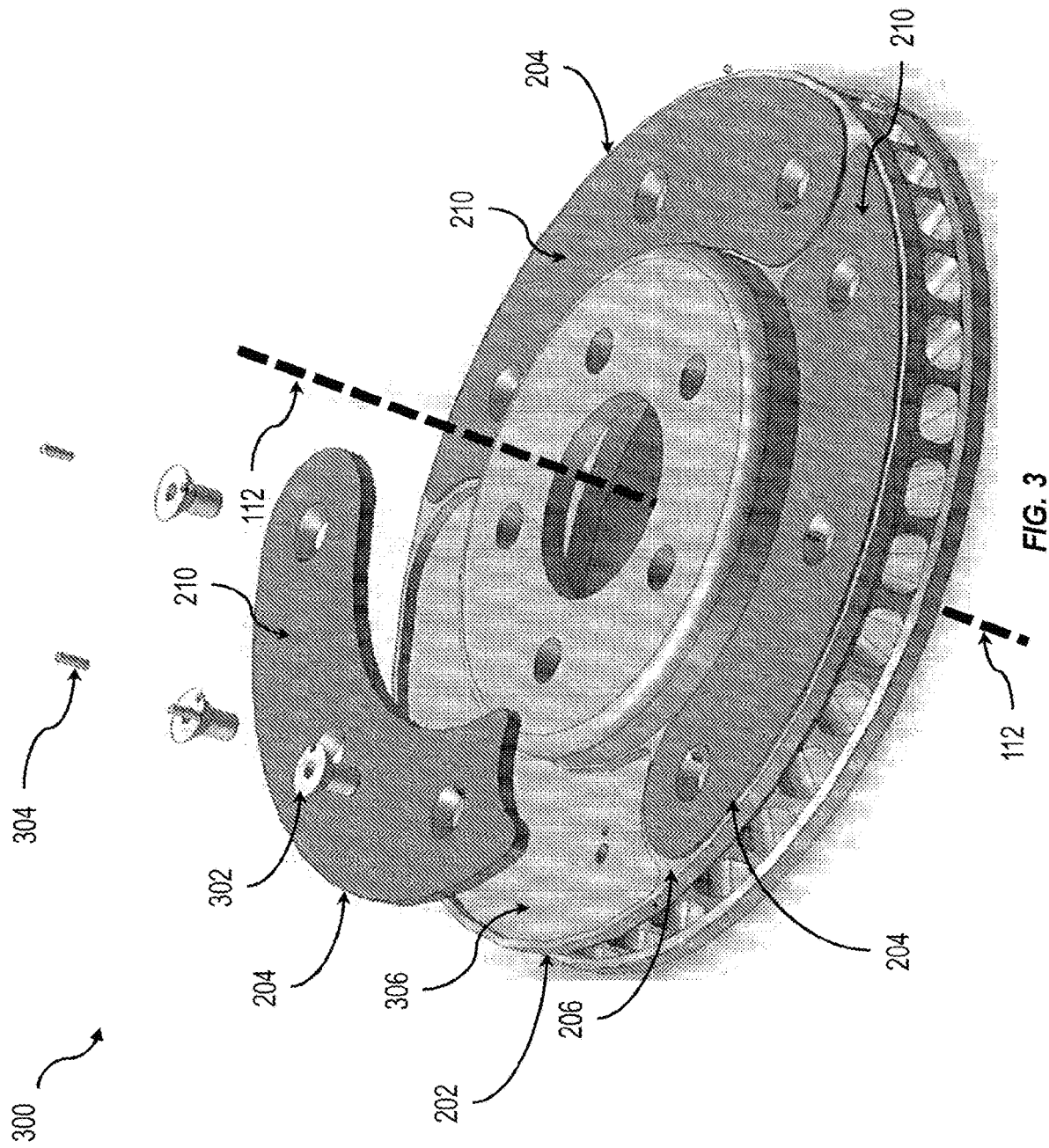
FIG. 3 shows a diagram illustrating features of another brake rotor assembly consistent with implementations of the current subject matter.

A brake rotor assembly consistent with implementations of the current subject matter can be manufactured in multiple parts, which can be assembled prior to use in braking a vehicle. As illustrated in the brake rotor assembly 300 shown in FIG. 3, multiple friction surface parts 204 can form either or both of two opposed friction surfaces of the brake rotor assembly 300 upon being fixably attached to one or more mating portions, for example a receiving surface 206, of a structural part 202. Fixable attachment of a friction surface part 204 to the structural part 202 can be accomplished using one or more approaches. As non-limiting examples, a friction surface part 204 can be fixably attached to a structural part 202 using one or more attachment features, such as for example screws or bolts 302, connecting pins 304, an adhesive, welding or brazing, one or more at least partially recessed or indented areas 306 on a receiving surface 206 of the structural part 202 into which at least part of the friction surface part 202 can be seated, or the like. The multiple friction surface parts 204 forming a friction surface of the brake rotor assembly 300 can optionally have a repeatable and interchangeable shape, which can facilitate mass production of such friction surface parts 204. Alternatively, one or more of the multiple friction surface parts 204 that form a friction surface of a brake rotor assembly 300 can have different shapes.

Figure 4:
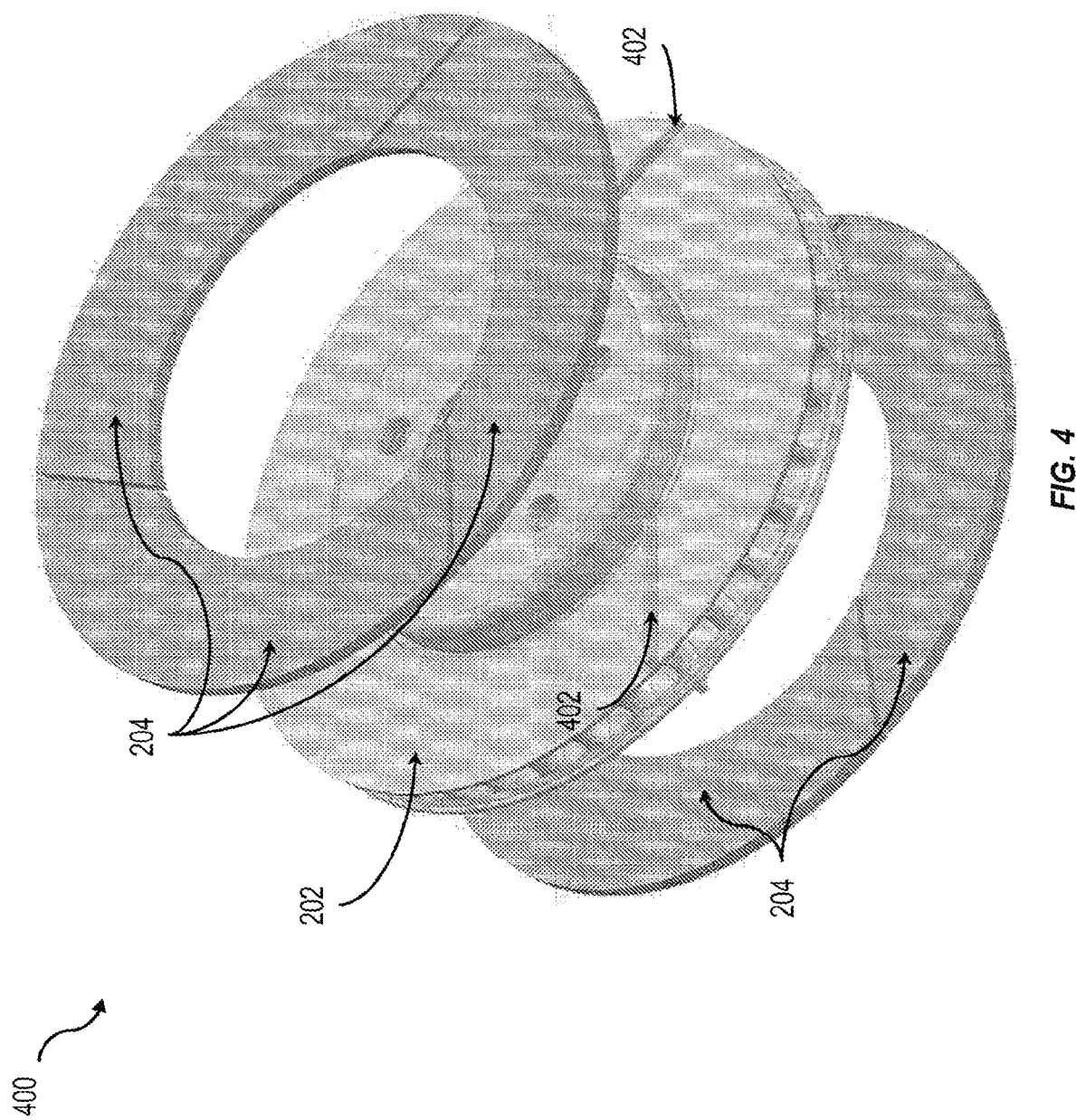
FIG. 4 shows a diagram illustrating features of another brake rotor assembly consistent with implementations of the current subject matter.
Figure 5:
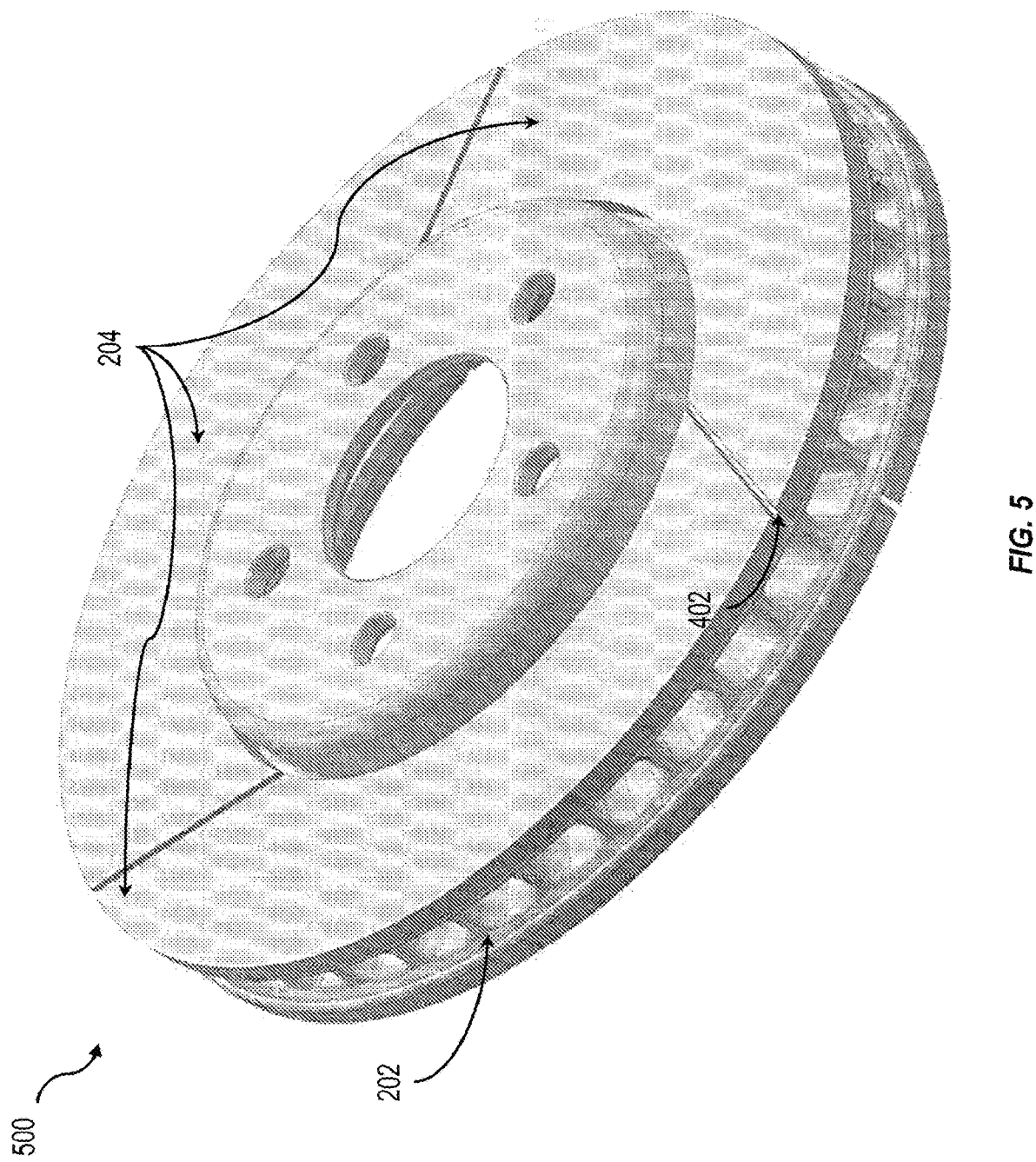
FIG. 5 shows a diagram illustrating features of the brake rotor assembly of FIG. 4.

FIG. 4 shows an expanded view of another example of a brake rotor assembly 400 in which a braking surface of the brake rotor assembly 400 includes three similarly shaped friction surface parts 204 and the structural part 202 includes retaining ridges 402 or other similar structures spaced such that each of the friction surface parts 204 can be arranged on the receiving surface 206 of the structural part 202 between two of the retaining ridges 402 when the brake rotor assembly 400 is assembled. The retaining ridges 402 can provide rotational stability such that the friction surface parts 204 are maintained in a stationary relationship relative to the structural part 202. FIG. 5 shows an assembled view 500 of the brake rotor assembly 400 shown in FIG. 4.

Figure 6:
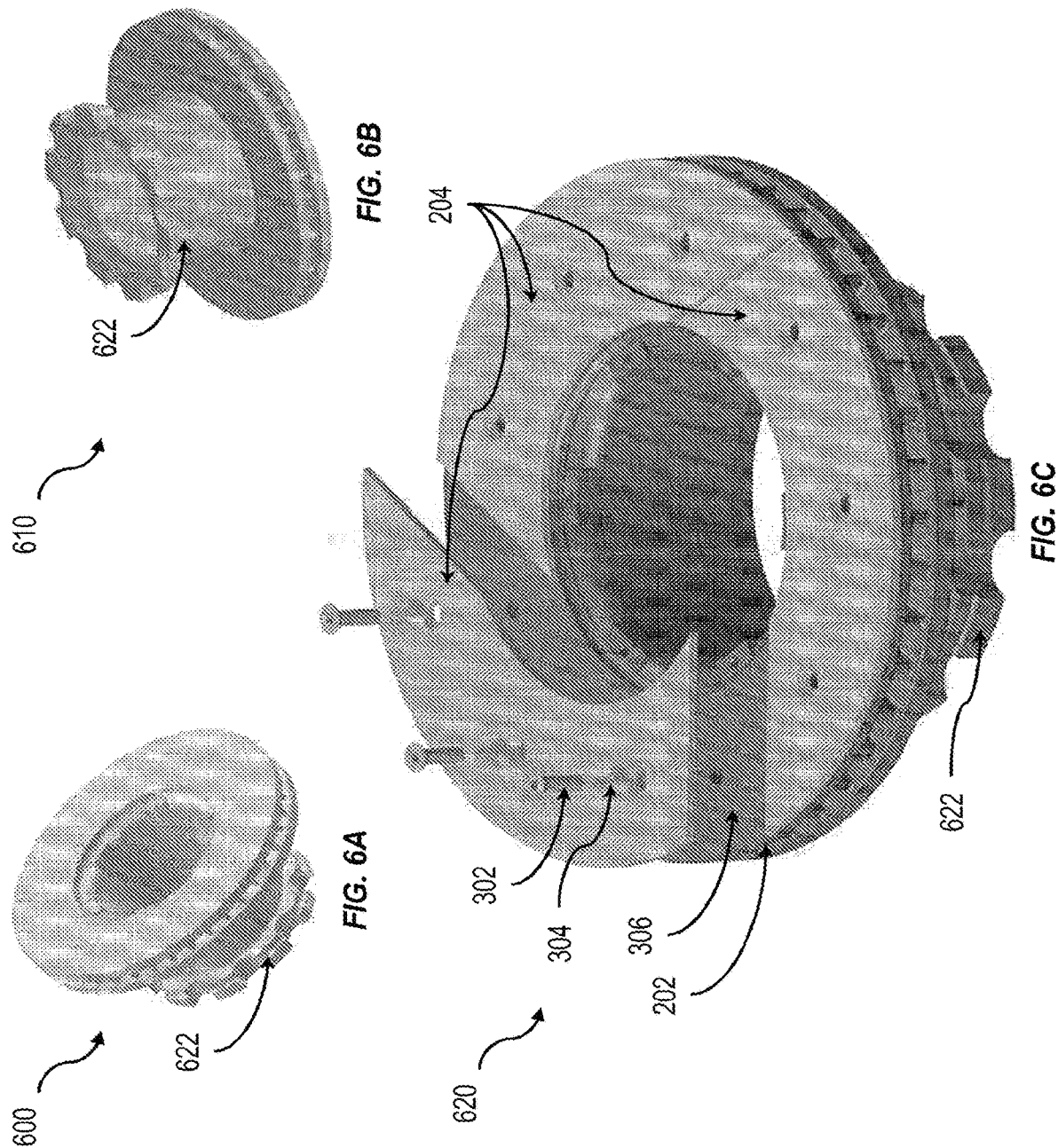
FIG. 6A, FIG. 6B, and FIG. 6C show diagrams illustrating features of another brake rotor assembly consistent with implementations of the current subject matter.

FIG. 6A, FIG. 6B, and FIG. 6C show views 600, 610, 620 of an additional example of a brake rotor assembly. In this example, the structural part 202 includes a hub section 622 with sufficient bulk that a single friction surface part 204 that forms a complete circle would not be possible to secure to at least one side of the structural part 202. In a similar manner, tiling of two or more friction surface parts 204 attached to a structural part 202 can allow accommodating of one or more of slots, holes, grooves, or other features of the structural part 202.

The structural part 202 of a brake rotor assembly consistent with implementations of the current subject matter can include one or more bulk materials, which can include, but are not limited to ceramics, metal matrix, composite materials, cast iron, carbon fiber, or the like. The friction surface parts 204 can be chosen from a variety of materials as well. For example, in some implementations of the current subject matter, the friction surface parts 204 can be stainless steel. In this manner, a stainless steel friction surface can be provided on a brake rotor assembly without requiring that the entire brake rotor assembly be formed of stainless steel. Given the expense of stainless steel, an approach that allows a stainless steel braking surface without requiring that an entire brake rotor assembly be formed of stainless steel can be quite beneficial.

In other implementations of the current subject matter, one or more friction surface parts 204 forming part of a brake rotor assembly can be formed of a brake pad friction material. In such an arrangement, the friction material 110 of a brake pad 106 of a braking system can optionally include a same or different friction material. In the example of the brake pads 106 including the same fiction material as used on the friction surface parts, the braking system can exhibit features of adherent and/or adhesive friction, which can provide enhanced braking power relative to a conventional braking system. Alternatively, the brake pads can be formed of some other material, such as for example stainless steel, cast iron, a ceramic, a composite, or the like.

In still other implementations of the current subject matter, one or more friction surface parts 204 can be coated with a wear and corrosion resistant coating. The brake pads in this example can include a friction material 110. Alternatively, the brake pads can include the wear and corrosion resistant coating while one or more friction surface parts 204 include a brake pad friction material. In these examples, the wear and corrosion resistant coated parts (e.g. the brake pads 110 or the friction surface parts 204) can include one or more levels of surface topography as discussed below. While the following description of surface topography levels refers to such features on friction surface parts 204 that arc included in a brake rotor assembly, if will be understood that the same discussion can also apply to brake pad parts having the wear and corrosion resistant coating and one or more levels of surface topography.

Figure 7:
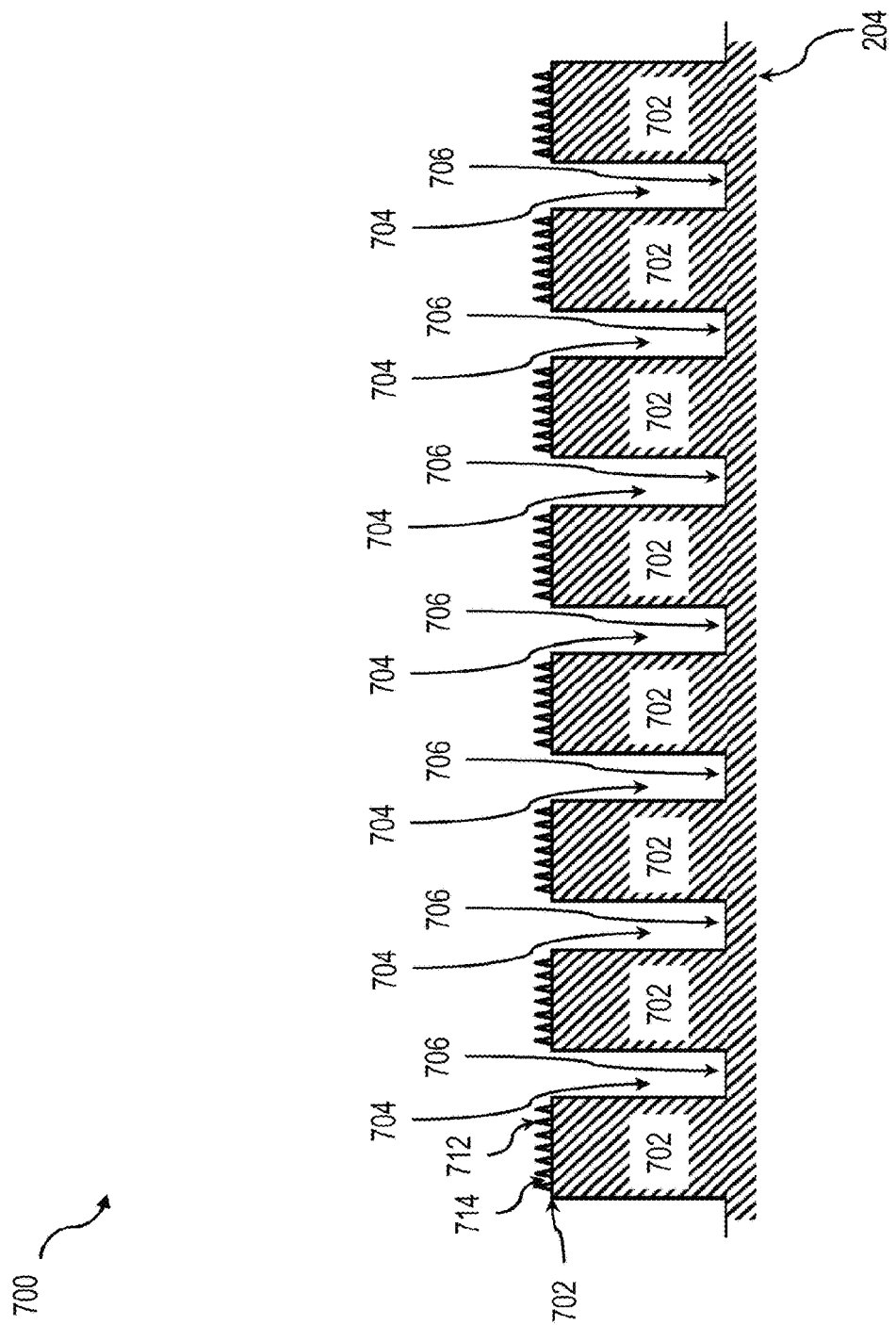
FIG. 7 shows a diagram illustrating a cross-sectional, magnified view of a friction surface part having two scales of surface topography.

Examples of surface topography can optionally include one or more scales of surface topography, for example as illustrated in the diagram 700 of a friction surface part 204 shown in of FIG. 7. At a first, larger scale, multiple island formations 702 can be included on a friction surface of the friction surface part 204. These multiple island formations can form a regular or irregular pattern in which islands are separated by channels 704, which can optionally have base surfaces 706 that are roughened. In one example, a representative distance from a top surface of the island formations 706 to a base surface 706 of channels formed between the island formations 702 can be in a range of approximately 10 microns (0.0005 inches) to 3200 microns (0.125 inches). A ratio of the area occupied by the island formations to the area occupied by the channels 704 can optionally be in a range of one percent to ninety-nine percent or vice versa.

In some examples, at least part of the base surfaces 706 of the inter-island channels 704 can have a surface roughness sufficient to create turbulence to air masses flowing in a direction parallel to a plane defined by the friction surface 104 of the rotor assembly 200 to which the friction surface part 204 is assembled, for example a surface orthogonal to an axis 112 about which the brake rotor assembly 200 rotates with a wheel of a motor vehicle. It will be understood that cross-sectional shapes of the island formations 702 can be substantially rectangular (e.g. as shown in FIG. 7) or any other regular or irregular shape. For example, the island formations 702 can have substantially triangular, substantially trapezoidal, substantially circular, substantially curved, or any other regular or irregular cross-sectional shape as viewed in a plane perpendicular a friction surface 104 of a brake rotor 102. Various shapes of the island formations 702 as viewed in other planes are also within the scope of the current subject matter. For example, the island formations 702 can have substantially circular, substantially square, substantially rectangular, substantially tear drop shaped, substantially curved, or any other regular or irregular shape as viewed in a plane parallel to a friction surface 104 of the friction surface part 204.

A second, smaller scale of surface topography on a friction surface part 204 can optionally include raised "peaks" 712 with spaced "valleys" 714 between (and around, etc.) the peaks 712. A uniform pattern can be used throughout the friction surface part 204. Alternatively or in addition, a combination of different shaped surface features can be included to present a visible design or texture that can vary in a random or predetermined manner across the friction surface part 204. The peaks 712 can optionally have sharp, angular cross-sectional shapes. Other shapes of the peaks 712 and valleys 714 are also within the scope of this disclosure. Shapes of the peaks 712 can include, but are not limited to squares, trapezoids, rectangles, triangles, stars, letters or names, numbers, logos, trademarks, dashes, other geometric shapes, and the like, with or without rounded corners. The shape and positioning of the peaks 712 can be designed to be aesthetically pleasing in appearance, which is particularly desirable when the friction surface part 204 as part of the brake rotor assembly 200 is externally visible, as is the case with many motor cycle brake rotors and some automotive rotors used in conjunction with alloy wheels or the like. The valleys 714 adjacent to and/or surrounding the peaks 712 can result in a significant reduction in the overall weight, which in turn can improve the efficiency and performance of the motor vehicle. Additionally, the valleys 714 can allow for air flow around the peaks 712 for increased cooling and heat dissipation. The base of each valley 714 can optionally be roughened or modulated to provide bumps or the like that create turbulence in air flow along the valley 714 which can also improve the cooling effect.

Peaks 712 of desired shapes and dimensions can be formed in any suitable manner, for example by appropriate machining or other forming processes. Such peaks and valleys or other "surface roughness" features can be created on upper surfaces 710 of the island formations 702.

The second scale of surface topography can advantageously assist in retaining a transferred film or layer of brake pad material to the friction surface part 204. In the example of FIG. 7, the upper surfaces 710 of the island formations 702 can form the friction surface of friction surface part 204. The surface roughness at the second scale of surface topography (e.g. the peaks 712 and valleys 714) can act as an abrasive surface that effective scrapes some of the friction material 110 from the opposed braking surface. For example, a brake pad material 110 can be transferred onto a wear and corrosion resistant coated friction surface part 204 having one or more levels of surface topography as discussed above and being assembled as part of a brake rotor assembly, or brake pad material 110 can be transferred from a friction surface part 204 formed of such material onto a brake pad having a wear and corrosion resistant coating and one or more levels of surface topography as discussed above. This transferred brake pad material can be retained on (or in, by, etc.) the surface topography features in a transfer film layer on the friction surfaces of the wear and corrosion resistant surface. This transfer film layer can be retained on the friction surface of the friction surface part 204 (or brake pad having similar features) at least in part as a result of the second scale of surface topography, whose peaks 712 and valleys 714 can provide a structure that resists easy wiping off or other dislodging actions that might free the transfer film layer from a friction surface part 204 (or brake pad having similar features) that lacks such features.

The transfer film layer can provide significant benefits in both durability and braking effectiveness of the braking system 100. For example, the retained transfer film layer of the friction material can protect the underlying material of the friction surface part 204 (or brake pad having similar features) from abrasive friction interactions with the friction material. Instead, the friction material can interact with similar material present in the transfer film layer retained on the friction surface part 204 (or brake pad having similar features). The transfer film can also act to seal one more surfaces of the friction surface part to provide at least partial protection from possible corrosion (e.g. by preventing contact of salt, water, minerals, etc. with the bare surface of the friction surface part 204). The presence of similar materials on either side of the brake pad-brake rotor interaction during actuation of a braking system 100 can also provide improvements in braking power. In an example, the friction material and the transfer film layer on the friction surface part 204 (or brake pad having similar features) can experience a form of adherent and/or adhesive friction, in which brake pad material dynamically transfers in either direction, for example back and forth between the friction material and the transfer film layer on the friction surface part 204 (or brake pad having similar features), with a breaking and reforming of molecular bonds occurring as part of the process. This adherent and/or adhesive friction process can also be referred to as stiction.

While adherent and/or adhesive friction may occur to some small extent in previously available brake rotors, the absence of surface topography features (e.g. either or both of the peaks 712 and valleys 714 of the second scale of surface topography and optionally also the island formation 702 and channels 704 of the first scale of surface topography described herein) on the surfaces of conventional rotors can render this effect relatively insignificant. For example, the amount of transferred friction material present per unit area in a transfer film layer occurring on a conventional rotor can be orders of magnitude smaller than that present in a friction surface part 204 (or brake pad having similar features) having features described herein. Additionally, without a surface topography structure capable of retaining a transfer film layer, the impact of adherent and/or adhesive friction can be diminished as the transfer film layer would not be laterally anchored to the friction surface of the friction surface part 204 (or brake pad having similar features) or otherwise resistant to rotational motion about the friction surface of the friction surface part 204 (or brake pad having similar features) during actuation of the braking system except by relatively weak van der Waals or electrostatic forces. The first scale of surface topography (e.g. island formations 702 and channels 704) and/or the second scale of surface topography (e.g. peaks 712 and valleys 714) described herein, or functional or structural equivalents thereof, can provide a mechanical anchoring mechanism by which a transfer film layer has increased resistance to rotational forces and/or other forces or effects that might act to dislodge the transfer film layer from the friction surface when the braking system 100 is actuated. It should be noted that a transfer film layer can also be formed even without macro-scale surface topography features. For example, a polished surface of a friction surface part 204 (or brake pad having similar features) having a wear and corrosion coating consistent with those described herein can also retain a transfer film layer having similar properties to those discussed above.

Other potential advantages can result for a friction surface part 204 (or brake pad having similar features) having one or more scales of surface topography as described herein that are sufficient to generate and retain a transfer film layer that includes transferred friction material. For example, the transfer film layer can act as a protective layer that reduces abrasive friction on the friction surface of the friction surface part 204 (or brake pad having similar features). This protective feature can be beneficial in extending the useful lifetime of a brake rotor assembly consistent with implementations of the current subject matter as overall wear of the friction surfaces can be reduced. Adherent and/or adhesive friction and/or one or more other mechanisms that improve braking effectiveness of a braking system that includes such a brake rotor assembly and with creation of a transfer film layer can also reduce wear of the friction material (e.g. from the brake pad 106 or from a friction surface part 204 formed of the friction material. This effect may also result from the increased importance of adherent and/or adhesive friction relative to abrasive friction as well as the possibility that a "stickier" brake rotor to brake pad material interaction can require less overall force to be applied during actuation of the braking system. The presence of a transfer film layer, or possibly other factors or features of braking systems and methods consistent with the current disclosure, can also provide for a very progressive, linear braking feel, which can result in safer and more controllable braking. Decreased wear of the friction material of a brake pad can reduce an amount of friction material debris created during actuation of the braking system 100 and released into the environment. As one or more chemical components of brake pad friction material can be damaging to the environment, human health, etc., this effect can has significant advantages, particularly in view of increasing governmental regulation of emission from braking systems.

A wear and corrosion resistant coating, either one that is consistent with the examples described herein or one formed using other approaches, can cause surface topography features of a friction surface of a friction surface part 204 (or brake pad having similar features) to be persistent and durable, even after prolonged use of the braking system (e.g. in operation of a motor vehicle or the like). Spacing of the peaks 712 and valleys 714 that are formed in such a surface configuration can be regular or irregular. The peak and valley configuration can operate during braking to transfer some of the material of a brake pad to the brake rotor such that subsequent braking can be enhanced due to adherent and/or adhesive friction between the similar brake pad material on the pad itself and on the rotor surface, as discussed in more detail below.

In implementations of the current subject matter, a friction surface part 204 (or brake pad having similar features) formed of stainless steel, cast iron, or some other bulk material having desirable bulk characteristics (e.g. sufficient rigidity, desirable weight properties, cost, etc.) can be prepared with a wear and corrosion resistant coating. Such a rotor can be cleaned, for example to remove impurities such as oil, grease, dirt, oxides, and the like.

The cleaned friction surface part 204 (or brake pad having similar features) can then be pre-treated using a back-sputtering process performed under a controlled atmosphere (e.g. a vacuum, a partial vacuum, an inert atmosphere such as argon, xenon, krypton, or the like, etc.). A back-sputtering process can include generating ions, which are accelerated toward a surface of the brake rotor substrate by a biasing voltage. In some examples, the biasing voltage can be in a range of approximately 800 to 1200 V or alternatively in a range of about 600 to 1000 V, and the back-sputtering process can be applied for a duration of about 3 to 20 minutes or for other durations depending on one or more of physical properties of the friction surface part 204 (or brake pad having similar features), desired surface characteristics, chemical properties of the friction surface part 204 (or brake pad having similar features) material, etc. The pre-treatment process can further clean the surface of the friction surface part 204 (or brake pad having similar features) in addition to activating the surface to enhance its receptivity to subsequent physical vapor deposition processes.

One or more supporting layers of a preparatory metal or metal alloy can be deposited onto surfaces of the pre-treated friction surface part 204 (or brake pad having similar features). The one or more supporting layers can act as a support for a wear and corrosion resistant outer coating applied to the friction surface part 204 (or brake pad having similar features) consistent with the current subject matter. As used herein, a preparatory metal or metal alloy can include one or more of chrome, nickel, or other similar materials. The preparatory layer can be formed to meet a variety of functional or decorative purposes, such as for example enhanced environmental corrosion protection, galvanic corrosion protection (or perhaps to accelerate corrosion of a sacrificial material or the like), regenerative braking, electro-magnetic braking, sensing, radio frequency identification (RFID), serving as decorative base layer for photo-chemical etching, or the like. In optional variations, the material of a supporting layer can be applied using a wet plating process, plasma spraying, or any other methods capable of applying one or more metallic coatings with a thickness in a range between a fraction of a micron to several thousand microns thick. In an advantageous implementation, the one or more supporting layers of the preparatory metal can be applied using one or more of a physical vapor deposition process, a sputtering process, an evaporative or cathodic arc process, or the like.

FIG. 8A shows a side cross-sectional view illustrating features of a friction surface part 204 (or brake pad having similar features) 800 consistent with implementations of the current subject matter. A shown in FIG. 8A, an outer surface 801 of a friction surface part 204 (or brake pad having similar features) has a supporting layer 804 applied to it. Subsequent to the coating of the friction surface part 204 (or brake pad having similar features) surface with the supporting layer 804, a wear and corrosion resistant coating, which can include a first layer 806 of a first layer material and a second layer 810 of a second layer material, can be applied over the supporting layer 804. In various implementations, the first layer material includes a metal or metal alloy, such as for example pure titanium metal or other metals (e.g. chromium, zirconium, aluminum, hafnium, etc.) and the second layer material includes a nitride, boride, carbide or oxide of the first layer material. Either or both of the first layer 806 and the second layer 810 can be applied using a method such as physical vapor deposition, sputtering, or the like after the supporting layer 804 is in place. Each of the first layer and the second layer can also be repeated, either alternatively (e.g. in a first layer, second layer, first layer, second layer sequence) or to build a larger amount of the first layer material followed by a larger amount of the second layer material (e.g. in a first layer, first layer, first layer, second layer, second layer, second layer sequence). In some implementations of the current subject matter as discussed below, one or more layers of graphene can be included, either as an additional layer or in some examples as a replacement for the first material and/or second material.

FIG. 8B shows a side cross-sectional view illustrating features of a friction surface part 204 (or brake pad having similar features) consistent with implementations of the current subject matter. As shown in FIG. 8B (and similar to the example of FIG. 8A, the outer surface 801 of a friction surface part 204 (or brake pad having similar features) has a supporting layer 804 applied to it. Subsequent to the coating of the friction surface part 204 (or brake pad having similar features) surface with the supporting layer 804, a wear and corrosion resistant coating, which can include a first layer 806 of a first layer material and a second layer 810 of a second layer material, can be applied over the supporting layer 804. FIG. 8B further illustrates that the deposited layers need not be homogeneous and discrete. Instead, in one example, a first layer 806 of the first material can be at least partially integrated with a second layer 810 of the second material to form a layer 812 combining elements from each of the two layers.

A combination of the cleaning and pre-treating of the friction surface part 204 (or brake pad having similar features), in addition to application of a supporting layer 804, can provide a suitable substrate for subsequent deposition of one or more iterations of the first layer 806 and second layer 810 of the wear and corrosion resistant coating as discussed elsewhere herein.

The first layer 806 can include an amorphous (non-crystalline) structure or a crystalline structure. The first layer 806 can include multiple layers or multiple layers that can be merged to form a single layer. The thickness of each layer of the first layer 806 can vary from one or a few atoms in depth to thousands of Angstroms. The surface irregularity or defect can be variations in the height of the parallel surfaces and angled surfaces between the variations in height illustrated in FIG. 7. In addition, the surface irregularity or modification can be formed as peaks, valleys and angular surfaces between the peaks and valleys. When the surface of the friction surface part 204 (or brake pad having similar features) is subsequently coated with the supporting layer and the wear and corrosion resistant coating, the coated surfaces can continue to exhibit a three dimensional appearance or surface texture. Furthermore, the surface texturing of the surfaces of the brake rotor are durable and wear resistant such that the three dimensional appearance or surface texture persistent, even after extended use of a brake rotor that includes the friction surface part 204 (or brake pad having similar features) in a vehicle braking system.

The wear and corrosion resistant coating can also include a second layer 810 that overlays and contacts the first layer 806. Though the first and second layers 806, 810 and the supporting layer are depicted as distinct, in some implementations of the current subject matter, the layers intermingle or merge such that no distinct boundary exists between the layers. The second layer material can include one or more binary metals, for example, one or more metal nitrides, metal borides, metal carbides and metal oxides. The second layer material can include one or more nitrides, borides, carbides or oxides of the metal used in the first layer. In some examples, amorphous titanium can form some or all of the first layer 806 and a titanium nitride (TiN, TiXN, etc.) can form all or some of the second layer 810. The multiple layers, for example the first and second layers 806, 810, optionally repeated one or more times, can be configured to form a lattice structure or a super lattice structure, which can include thin films formed by alternately depositing two different components to form layered structures. Multilayers become super-lattices when the period of the different layers is less than 100 angstroms. With this cooperation of structure, a coating having a service life to exceed approximately 100,000 vehicle miles or more can be obtained. It should be noted that chemical abbreviations (e.g. TiN, Ti2N, etc.) are used herein as a shorthand rather than an exact chemical label, and do not suggest that the stoichiometry of the indicated compound must be exactly as stated in the abbreviation.

The wear and corrosion resistant coating can cause surface roughness features on a surface of the friction surface part 204 (or brake pad having similar features) to be significantly more durable to wear from normal braking activities. As such, peak 712 and valley 714 topography (or other surface topography features) that is originally present on the surface of a friction surface part 204 (or brake pad having similar features) prior to use in braking can persist for a large percentage of the useful life of the friction surface part 204 (or brake pad having similar features), which can in some implementations be many multiples of a typical useful lifetime for a conventional brake rotor without a wear and corrosion resistant coating as described herein.

The hardness of the coating on the friction surfaces of a friction surface part 204 (or brake pad having similar features) can dictate how persistent the surface roughness condition of the friction surfaces is over repeated braking events. A typical, uncoated brake rotor constructed of stainless steel, light weight metal alloys (e.g. titanium alloys), ceramic materials, ceramic composite materials, titanium, etc. and/or combinations thereof generally has a hardness as measured on the Rockwell "C" scale of about 35±8. Cast iron, titanium, and other relatively softer materials can also be used in brake rotors. The surface roughness features of the surface of a friction surface part 204 (or brake pad having similar features) according to implementations of the current subject matter can be characterized by an average amplitude between the peaks 712 and valleys 714 of the second scale of surface topography, which can in some implementations be in a range of approximately 0.6 μm to 0.85 μm (approximately 26-32 micro-inches). In addition to improved durability resulting from increased hardness of the surface of a friction surface part 204 (or brake pad having similar features), in some implementations of the current subject matter, a coating imparting wear and corrosion resistance consistent the descriptions herein can also provide a type of solid lubrication. For example, inclusion of chromium and/or possibly other solid lubricant-type metals can cause the surface of the friction surface part 204 (or brake pad having similar features) to be have increased hardness as well as increased "slipperiness," which can counteract the wear effects of abrasive friction occurring between a friction material of a friction surface of the friction surface part 204 (or brake pad having similar features).

According to implementations of the current subject matter, an optimized relationship between the surface roughness and the surface hardness can be obtained to maximize persistence of the peak 712 and valley 714 surface roughness features over a useful lifetime of a brake rotor assembly or brake pad that includes a friction surface part 204 (or brake pad having similar features). The optimal relationship between the surface roughness and surface hardness is one at which the peak and valley topography is maintained to allow continued transfer and retention of friction material to a friction surface of the friction surface part 204 (or brake pad having similar features) such that adherent and/or adhesive friction between the transferred friction material and the friction material adds to abrasive friction forces between the friction surface part 204 (or brake pad having similar features) and the friction material to improve the stopping power of a braking system 100.

Excessive hardness may lead to brittleness, while too little hardness may lead to premature wear of the surface roughness features. Also, excessive surface roughness may lead to too rapid a consumption of the friction material as too much of the friction material is transferred to and potentially scaled away from the friction surface of the friction surface part 204 (or brake pad having similar features). Too little surface roughness on the friction surface part 204 (or brake pad having similar features) may lead to too little transfer of friction material and/or too little retention of the transferred friction material on the friction surfaces of the friction surface part 204 (or brake pad having similar features), thereby weakening the braking power and potentially requiring greater reliance on abrasive friction, which can lead to increased wear.

An additional variable in the analysis of an optimal surface roughness and surface hardness regime can be the composition and other physical properties of the friction material. For example, a brake pad material (e.g. a friction material) that is readily transferrable and/or adherable to a friction surface of a friction surface part 204 (or brake pad having similar features) may require a less pronounced surface roughness to create the advantages disclosed herein for the inventive subject matter. In such an example, a relatively lower surface roughness may be used in conjunction with an increased surface hardness as the lower amplitude between the peaks 712 and valleys 714 of the surface topography of the friction surface part 204 (or brake pad having similar features) can be less prone to damage due to the increased brittleness that can accompany increased surface hardness.

In addition to the implementations of the current subject matter discussed above, other configurations are also contemplated. For example, a brake rotor assembly that includes multiple friction surface parts 204 need not have all of the friction surface parts 204 include identical friction surfaces. In this manner, some of the friction surface parts 204 can be optimized for one braking condition while other of the friction surface parts 204 can be optimized for other braking conditions.

FIG. 9 shows a process flow chart 900 illustrating features that can be present in one or more implementations of the current subject matter. At 905, a friction surface part having a contact surface is positioned on a receiving surface of a structural part. The contact surface is aligned perpendicularly to an axis of rotation of the structural part. At 910, the friction surface part is fixably attached to the receiving surface of the structural part such that the contact surface faces away from the receiving surface of the structural part to form at least part of an annular braking surface arranged concentrically around an axis of rotation of the structural part.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A brake rotor assembly, comprising:
a structural part having a receiving surface aligned perpendicularly to an axis of rotation of the structural part, the structural part of the brake rotor comprised of a material not including stainless steel; and
at least two friction surface parts, each friction surface part having a contact surface, the at least two friction surface parts being comprised of stainless steel, the at least two friction surface parts fixably attached to the receiving surface of the structural part such that the contact surfaces face away from the receiving surface of the structural part to form at least part of an annular braking surface arranged concentrically around the axis of rotation, each of the structural parts, the at least two friction surface parts, the contact surfaces, and the receiving surfaces are positioned on the same plane, the at least two friction surface parts coated with a wear and corrosion resistant coating, the wear and resistant coating including a support layer, a first layer, and a second layer, the at least two friction surface parts arranged on the receiving surface to form the at least part of the annular braking surface;
the receiving surface having an upper portion and a lower portion, wherein the contact surface of the friction surface part is spaced apart from the upper portion of the receiving surface of the structural part.

2. The brake rotor assembly of claim 1 wherein more than one friction surface parts are fixedly attached to the receiving surface of the structural part.

3. The brake rotor assembly of claim 2 wherein the structural part includes retaining ridges spaced such that each of the friction surface parts can be arranged on the receiving surface of the structural part between two of the retaining ridges when the brake rotor assembly is assembled wherein the retaining ridges provide rotational stability such that the friction surface parts are maintained in a stationary position.

4. The brake rotor assembly of claim 1 wherein a surface topography includes one or more scales of surface topography forming a pattern in which islands are separated by channels.

5. A brake rotor assembly, comprising:
a structural part having a receiving surface aligned perpendicularly to an axis of rotation of the structural part, the structural part of the brake rotor comprised of a material not including cast iron; and
at least two friction surface parts, each of the at least two friction surface parts having a contact surface, the at least two friction surface parts having two or more scales of surface topography forming a pattern in which islands are separated by channels, the two or more scales of surface topography include a first, larger scale, and a second, smaller scale, the second scale of topography having a uniform pattern, the at least two friction surface parts being comprised of cast iron, the at least two friction surface parts fixably attached to the receiving surface of the structural part such that the contact surface faces away from the receiving surface of the structural surface to form at least part of an annular braking surface arranged concentrically around the axis of rotation, each of the structural part, the at least two friction surface parts, the contact surfaces, and the receiving surfaces are positioned on the same plane, the at least two friction surface parts part is coated with a wear and corrosion resistant coating, the wear and resistant coating including a support layer, a first layer, and a second layer, the at least two friction surface parts arranged on the receiving surface to form the at least part of the annular braking surface;
the receiving surface having an upper portion and a lower portion, wherein the contact surface of the friction surface part is spaced apart from the upper portion of the receiving surface of the structural part.

6. A brake rotor assembly, comprising:
a structural part having a receiving surface aligned perpendicularly to an axis of rotation of the structural part, the structural part of the brake rotor comprised of a material not including a composite; and
at least two friction surface parts, each of the at least two friction surface parts having a contact surface, the at least two friction surface parts having two or more scales of surface topography forming a pattern in which islands are separated by channels, the two or more scales of surface topography include a first, larger scale, and a second, smaller scale, the second scale of topography having a uniform pattern, the at least two friction surface parts being comprised of a composite, the at least two friction surface parts fixably attached to the receiving surface of the structural part such that the contact surface faces away from the receiving surface of the structural surface to form at least part of an annular braking surface arranged concentrically around the axis of rotation, each of the structural part, the at least two friction surface parts, the contact surfaces, and the receiving surfaces are positioned on the same plane, the at least two friction surface parts is coated with a wear and corrosion resistant coating, the wear and resistant coating including a support layer, a first layer, and a second layer, the at least two friction surface parts arranged on the receiving surface to form the at least part of the annular braking surface;
the receiving surface having an upper portion and a lower portion, wherein the contact surface of the friction surface part is spaced apart from the upper portion of the receiving surface of the structural part.

7. A brake rotor assembly, comprising:
a structural part having a receiving surface aligned perpendicularly to an axis of rotation of the structural part; and
at least two friction surface parts, each of the at least two friction surface parts having a contact surface, the at least two friction surface parts having two or more scales of surface topography forming a pattern in which islands are separated by channels, the two or more scales of surface topography include a first, larger scale, and a second, smaller scale, the second scale of topography having a uniform pattern, the at least two friction surface parts being comprised of an amorphous material, the at least two friction surface parts fixably attached to the receiving surface of the structural part such that the contact surface faces away from the receiving surface of the structural surface to form at least part of an annular braking surface arranged concentrically around the axis of rotation, each of the structural part, the at least two friction surface parts, the contact surfaces, and the receiving surfaces are positioned on the same plane, the at least two friction surface parts part is coated with a wear and corrosion resistant coating, the wear and resistant coating including a support layer, a first layer, and a second layer, the at least two friction surface parts arranged on the receiving surface to form the at least part of the annular braking surface;

the receiving surface having an upper portion and a lower portion, wherein the contact surface of the friction surface part is spaced apart from the upper portion of the receiving surface of the structural part.

* * * * *